United States Patent
Gruber et al.

(10) Patent No.: US 10,737,796 B2
(45) Date of Patent: Aug. 11, 2020

(54) PROPULSION ASSEMBLY FOR AN AIRCRAFT HAVING A TURBOJET WITH A NON-DUCTED FAN AND AN ATTACHMENT PYLON

(71) Applicant: SNECMA, Paris (FR)

(72) Inventors: Mathieu Simon Paul Gruber, Chennevieres sur Marne (FR); Timothy Delteil McWilliams, Paris (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 1069 days.

(21) Appl. No.: 15/182,860

(22) Filed: Jun. 15, 2016

(65) Prior Publication Data
US 2017/0088276 A1    Mar. 30, 2017

(30) Foreign Application Priority Data

Jun. 15, 2015   (FR) ...................................... 15 55424

(51) Int. Cl.
*B64D 27/20*    (2006.01)
*B64D 29/06*    (2006.01)
(Continued)

(52) U.S. Cl.
CPC .............. *B64D 27/20* (2013.01); *B64C 21/04* (2013.01); *B64D 27/26* (2013.01); *B64D 29/06* (2013.01);
(Continued)

(58) Field of Classification Search
CPC ....... B64C 21/025; B64C 21/04; B64C 21/06; B64C 21/08; B64C 2201/04;
(Continued)

(56) References Cited

U.S. PATENT DOCUMENTS

| | | | | |
|---|---|---|---|---|
| 2,646,945 A | * | 7/1953 | Perry | .................... B64C 21/025 |
| | | | | 244/204 |
| 4,917,336 A | * | 4/1990 | Jacobs | .................... B64C 23/00 |
| | | | | 244/130 |

(Continued)

FOREIGN PATENT DOCUMENTS

| | | |
|---|---|---|
| EP | 2 327 628 A2 | 6/2011 |
| FR | 2 949 754 A1 | 3/2011 |

(Continued)

OTHER PUBLICATIONS

Search Report as issued in French Patent Application No. 1555424, dated Feb. 25, 2016.

*Primary Examiner* — Richard R. Green
(74) *Attorney, Agent, or Firm* — Pillsbury Winthrop Shaw Pittman LLP

(57) ABSTRACT

A propulsion assembly for an aircraft, the assembly including a turbojet having at least one unducted propulsive propeller, and an attachment pylon for attaching the turbojet to a structural element of the aircraft, the pylon being positioned on the turbojet upstream from the propeller and having a streamlined profile defined by two opposite side faces extending transversely between a leading edge and a trailing edge. The pylon includes a plurality of blow nozzles situated in the vicinity of its trailing edge and configured to blow air taken from a pressurized portion of the turbojet, the blow nozzles being positioned over at least a fraction of the trailing edge of the pylon that extends longitudinally facing at least a portion of the propeller. A method of reducing the noise generated by a pylon attaching a turbojet to an aircraft is presented.

6 Claims, 2 Drawing Sheets

(51) Int. Cl.
  *B64C 21/04* (2006.01)
  *B64D 27/26* (2006.01)
  *F02C 6/20* (2006.01)
  *F02C 7/045* (2006.01)
  *B64D 29/04* (2006.01)
  *B64D 27/00* (2006.01)

(52) U.S. Cl.
  CPC .............. *F02C 6/20* (2013.01); *F02C 7/045* (2013.01); *B64C 2230/04* (2013.01); *B64C 2230/06* (2013.01); *B64C 2230/14* (2013.01); *B64D 29/04* (2013.01); *B64D 2027/005* (2013.01); *F05D 2220/323* (2013.01); *F05D 2260/96* (2013.01); *Y02T 50/166* (2013.01); *Y02T 50/66* (2013.01)

(58) Field of Classification Search
  CPC ............ B64C 2201/06; B64C 2201/14; B64C 2201/16; B64C 2201/22; B64C 2201/28; B64D 29/04; B64D 2027/025
  See application file for complete search history.

(56) References Cited

U.S. PATENT DOCUMENTS

| | | | |
|---|---|---|---|
| 7,152,829 B2 * | 12/2006 | Bertolotti | B64C 21/06 244/209 |
| 8,297,038 B2 * | 10/2012 | Stretton | B64D 29/04 60/204 |
| 8,690,106 B1 | 4/2014 | Reissig | |
| 8,714,477 B2 * | 5/2014 | Rinjonneau | B64D 33/10 165/41 |
| 8,904,795 B2 * | 12/2014 | Oishi | B64C 7/02 181/220 |
| 8,967,964 B2 * | 3/2015 | Sheaf | B64C 21/04 416/1 |
| 9,022,311 B2 * | 5/2015 | Thomas | B64C 21/08 244/1 N |
| 9,315,264 B2 * | 4/2016 | Zhu | B64C 21/08 |
| 9,656,742 B2 * | 5/2017 | Guillemaut | B64D 29/04 |
| 9,682,783 B2 * | 6/2017 | Bensilum | B64C 21/04 |
| 2011/0127374 A1 * | 6/2011 | Caballero Asensio | B64D 29/04 244/65 |
| 2011/0248116 A1 | 10/2011 | Diochon et al. | |
| 2015/0232170 A1 * | 8/2015 | Thomas | B64C 7/02 244/1 N |

FOREIGN PATENT DOCUMENTS

| | | |
|---|---|---|
| FR | 2 968 634 A1 | 6/2012 |
| FR | 2 971 765 A1 | 8/2012 |
| FR | 2 974 563 A1 | 11/2012 |
| GB | 2 138 507 A | 10/1984 |
| GB | 2 203 710 A | 10/1988 |

* cited by examiner

PROPULSION ASSEMBLY FOR AN AIRCRAFT HAVING A TURBOJET WITH A NON-DUCTED FAN AND AN ATTACHMENT PYLON

CROSS-REFERENCE TO RELATED APPLICATIONS

This application claims priority to French Patent Application No. 1555424, filed Jun. 15, 2015, the entire content of which is incorporated herein by reference in its entirety.

FIELD

The present invention relates to the general field of turbine engines, and it applies more particularly to turbojets with non-ducted propulsive propellers.

BACKGROUND

The present trend for civilian aeroengines seeks to reduce both their specific fuel consumption and the pollutants they reject to the atmosphere. One of the technical solutions adopted by engine manufacturers consists in increasing the bypass ratio between the primary stream (or "hot" stream) and the secondary stream (or "cold" stream) of the aeroengine. In this respect, several turbojet architectures have been proposed, including turbojets having pairs of contrarotating propellers (also known as "contrarotating open rotors" (CROR)), which are good candidates for replacing present turbojets, in particular on aircraft that perform medium-haul flights.

In another conventional turbojet architecture, a nacelle channels the secondary stream so as to produce the majority of the thrust. With the CROR architecture, the nacelle is removed and the propulsion system comprises an upstream propeller driving the flow and a downstream propeller that is contrarotating relative to the upstream propeller, and that has the function of straightening or guiding the flow (it being possible for the downstream propeller to be stationary in other types of architecture). The propulsion efficiency of the engine is improved by recovering rotary energy more effectively than with a stationary wheel, and the diameter of the propellers is also greatly increased in order to enable a larger quantity of air to be entrained.

Nevertheless, in the absence of a nacelle, sound emissions represent a major drawback for this architecture, and more particularly the noise generated by the propellers, and by various interactions between the propellers and the components associated with mounting the engine on the aircraft (also referred to as effects associated with installing the engine on the aircraft).

When the turbojet is mounted on the fuselage of an aircraft by means of an attachment pylon located upstream from the propellers, the configuration is said to be of the "pusher" type. In such a configuration, the presence of the attachment pylon is associated with several sources of noise, of which the major source is constituted by interaction between the wake (corresponding to a deficit of flow speed) created downstream from the pylon and the upstream propeller.

This interaction between the wake and the upstream propeller leads in particular to two types of noise:

a tonal type noise, corresponding to the interaction between the mean wake (constituted by a speed deficit downstream from the pylon) and the upstream propeller, which noise is present at the frequencies specific to the propeller; and a broadband type noise, corresponding mainly to the interaction between the turbulent structures of the wake and the upstream propeller, with the source of this noise being located at the leading edges of the blades of the upstream propeller, this noise covering a wide range of frequencies;

Several solutions have been proposed for reducing the sound nuisance produced by interaction between the wake from the pylon and the upstream propeller. By way of example, Document FR 2 968 634 proposes compensating the speed deficit downstream from the pylon in order to reduce the impact of the wake by using a pylon that has a trailing edge fitted with two tiltable faces, between which air can be blown over the entire span of the pylon. Nevertheless, such a solution presents the drawback of requiring a large amount of air to be taken from the engine, thereby reducing performance.

SUMMARY

A main aspect of the present invention is thus to mitigate the above-mentioned drawbacks by proposing a propulsion assembly for an aircraft, the assembly comprising a turbojet having at least one unducted propulsive propeller, and an attachment pylon for attaching the turbojet to a structural element of the aircraft, the pylon being positioned on the turbojet upstream from the propeller and having a streamlined profile defined by two opposite side faces extending transversely between a leading edge and a trailing edge, wherein the pylon has a plurality of blow nozzles situated in the vicinity of its trailing edge and configured to blow air taken from a pressurized portion of the turbojet, the blow nozzles being positioned over at least a fraction of the trailing edge of the pylon that extends longitudinally facing at least a portion of the propeller.

Another way of reducing interaction between the wake and the upstream propeller consists in increasing mixing downstream from the pylon so that the wake is filled in more quickly. To do this, the inventors have observed that increasing the amount of turbulence downstream from the pylon makes it possible to increase this mixing, and thus to reduce the impact of the wake on the upstream propeller.

The propulsion assembly of the invention makes it possible for the wake downstream from the pylon to have its impact on the upstream propeller reduced by increasing mixing downstream from the pylon and by modifying the structure of the wake. Specifically, the blow nozzles, which blow air in discrete manner over a fraction of the lengths of the pylon, makes it possible to destructure the wake by increasing the amount of turbulence downstream from the pylon, thus making it possible to improve the decrease in the speed deficit in the plane of the leading edge of the upstream propeller. In other words, increasing mixing serves to fill in the speed deficit more quickly downstream from the pylon, and thus to reduce the interaction between the wake and the upstream propeller.

Furthermore, since the flow is disturbed downstream from the pylon progressively as the jets blown through the nozzles mix with the wake, the wake becomes destructured and more diffuse. This destructuring of the wake has in particular the effect of reducing tonal interaction noise and broadband noise more effectively.

Furthermore, the use of air blown discretely through the blow nozzles of the invention makes it possible to reduce the quantity of air that is taken from the engine compared with blowing over the entire span of the pylon. It is also possible to reduce the outlet diameters of the nozzles in order to reduce the quantity of air that is taken, while conserving the same ejection speed.

In an embodiment of the invention, the nozzles may be present only over a fraction of the trailing edge of the pylon that is situated at least in part facing the propeller.

In an embodiment of the invention, the blow nozzles open out in line with the trailing edge of the attachment pylon.

In another embodiment of the invention, the blow nozzles open out in one and/or both of the side faces of the attachment pylon, the end of each blow nozzle may be flush with the side face of the attachment pylon in which it opens out. In this configuration, the blow nozzles serve to compensate the residual lift effect of the attachment pylon that might give rise to asymmetry of the wake.

In an embodiment, the blow nozzles are retractable into the inside of the attachment pylon. It is thus possible to retract the blow nozzles, e.g. by using actuators, during a stage of flight of the aircraft that does not require them to be used.

In an embodiment, the propulsion assembly further includes at least one valve configured for controlling the arrival of air at at least one blow nozzle. It is thus possible to obtain finer management over the zones in which blowing takes place by deactivating some or all of the nozzles, e.g. in order to concentrate blowing on the tips of the upstream propeller or on any other zone of interest, and also to deactivate blowing when it is not needed so as to reduce the quantity of air that is taken from the turbojet.

An aspect of the invention also provides a method of reducing the noise generated by an attachment pylon for attaching a turbojet to a structural element of an aircraft, the turbojet having at least one unducted propulsive propeller, the pylon being positioned on the turbojet upstream from the propeller and having a streamlined profile extending transversely between a leading edge and a trailing edge, the method including a step of blowing air taken from a pressurized portion of the turbojet from the trailing edge of the pylon via a plurality of blow nozzles positioned over at least a fraction of the trailing edge of the pylon extending longitudinally facing at least a portion of the propeller.

In an embodiment, the method further includes a step of controlling the air blown by the blow nozzles as a function of stages of flight of the aircraft.

In an embodiment, the air blown by the blow nozzles is pulsed at a predefined frequency that is less than the passing frequency of a blade of the propeller facing the pylon, in order to obtain fine control over the flow rate of air blown through the nozzles, and further reduce the amount of air taken from the engine. Also, by selecting a predefined frequency that is less than the passing frequency of a blade of the propeller facing the pylon, the method avoids creating a sound source of the tonal monopole type (due to a periodic signal) in the audible frequency range (20 hertz (Hz) to 20 kilohertz (kHz)).

In a variant, the air blown by the blow nozzles may be pulsed at a random frequency that is less than the passing frequency of blades of a propeller facing the pylon in order to avoid phenomena of time correlation between the blow nozzles of the pylon and the propeller, which can increase the noise generated by the sources as a whole.

In certain embodiments, the optionally random frequency at which the air blown through the blow nozzles is pulsed is less than or equal to 20 Hz.

BRIEF DESCRIPTION OF THE DRAWINGS

Other characteristics and benefits of the present invention appear from the following description made with reference to the accompanying drawings which illustrate embodiments having no limiting character. In the figures.

DETAILED DESCRIPTION

In the present description, the terms "longitudinal", "transverse", and terms derived therefrom are defined relative to the main axis of the pylon extending between the turbojet and the aircraft; the terms "upstream" and "downstream" are defined relative to the flow direction of the fluid passing through the turbojet.

Figure 1:
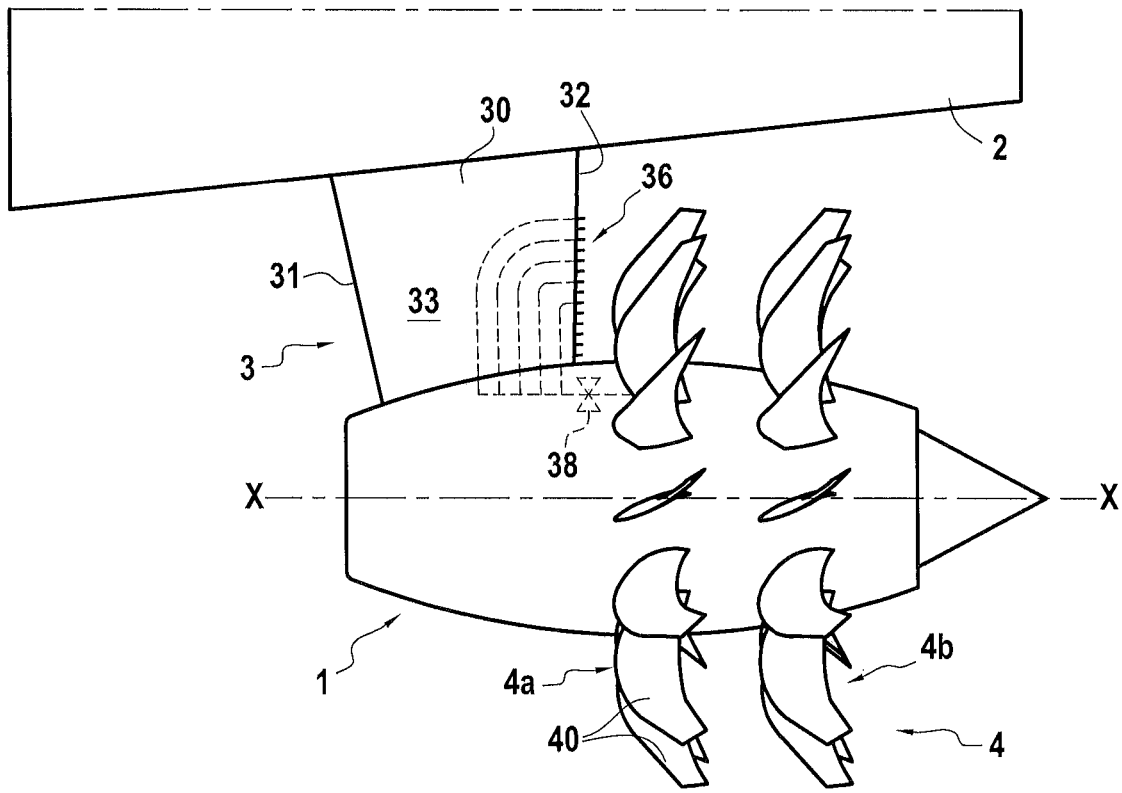
FIG. 1 is a diagrammatic view of a propulsion assembly of an embodiment of the invention.

FIG. 1 is a diagrammatic view of a propulsion assembly comprising a turbojet 1 attached to the fuselage 2 of an aircraft by means of an attachment pylon 3. The turbojet 1 is centered on an axis X-X and it has a pair of unducted propellers 4 constituted by a rotary upstream propeller 4a (having a blade set 40) and a downstream propeller 4b that is contrarotating relative to the upstream propeller 4a. The downstream propeller 4b could equally well be stationary and in the form of a variable pitch stator, as applies for example to so-called "unducted single fan" (USF) engines, or indeed it could be a stator without variable pitch. It should be observed that the turbojet 1 is in a so-called "pusher" configuration, i.e. the attachment pylon 3 is attached to the turbojet 1 upstream from the pair of propellers 4.

The attachment pylon 3 comprises a streamlined profile 30 defined by two opposite side faces 33 and 34 (FIGS. 2, 3, and 4) extending transversely between a leading edge 31 and a trailing edge 32. In accordance with the invention, the attachment pylon 3 has a plurality of blow nozzles 36 distributed over at least a portion of the trailing edge 32 of the pylon extending longitudinally facing the propeller 4a. These nozzles 36 open out at the trailing edge 32 of the pylon and they extend it. They are configured to blow air coming from a pressurized portion of the turbojet 1 (e.g. from the high pressure compressor, or the low pressure compressor, depending on the architecture of the turbojet), and the flow of air that they eject may be controlled by means of one or more valves 38 controlling all or part of the flow of air reaching a nozzle 36, or a group of nozzles.

The presence of one or more control valves 38 serves in particular to provide fine control over the portion of the pylon on which it is desired to blow air (for example, it is possible to concentrate blown air on the tip of the upstream propeller 4a), thereby reducing the quantity of air that is taken from the turbojet. A portion of the air circuit is shown diagrammatically in dashed lines in the figures, the air flow direction when blowing is active being represented by arrows.

In general manner, the blowing from the nozzles can be controlled in particular by the controlled valve 38 suitable for controlling the flow rate of air reaching a nozzle (or a group of nozzles), as a function of stages of flight of the aircraft. For example, blowing may be activated only during stages of the aircraft taking off and landing.

Figure 2:
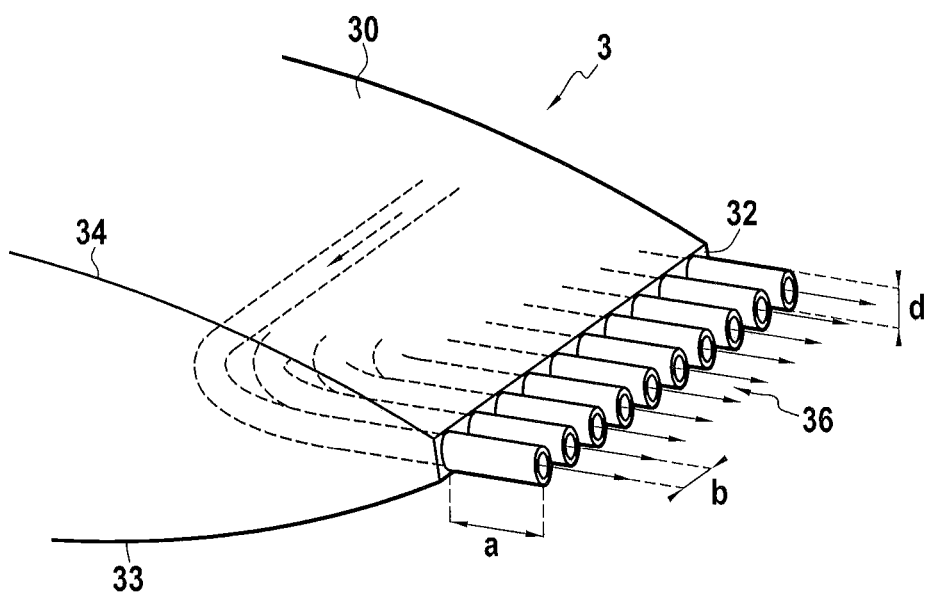
FIGS. 2 to 4 are diagrammatic views of the attachment pylon of a propulsion assembly in different embodiments of the invention.

FIG. 2 is an enlarged view of the FIG. 1, pylon 3 showing its trailing edge 32, which may indeed be truncated. It can be seen that the nozzles open out in the trailing edge 32 and extend it over a certain length a. It is also possible to envisage using blow nozzles 36 of length a that differs from one nozzle 36 to another, e.g. to provide shapes that are more complex in order to optimize the mixing in the wake downstream from the pylon 3. The length a of the nozzles 36 projecting out from the pylon 3 is, in an embodiment, of the same order of magnitude as the thickness of the boundary layer at the trailing edge 32 of the pylon when the aircraft is taking off (which corresponds to a Mach number of about 0.2). Generally, the boundary layer at the trailing edge 32 of the pylon under such conditions lies in the range 10 centimeters (cm) to 20 cm.

The attachment pylon 3 of the invention may also include a system (not shown) enabling the nozzles 36 to be retracted into the pylon 3. By way of example, this system may consist in actuators mounted inside the pylon and capable of retracting the nozzles into tubes situated inside the pylon (not shown), these tubes being of diameter that is slightly greater than the diameter of the nozzles.

The nozzles 36 have an outlet diameter d that may also vary, and it is desirable for the diameter to be determined so as to obtain jets that are sufficiently powerful to destabilize the flow as much as possible, while minimizing the amount of air taken off from the engine. It is also possible to envisage varying this diameter d from one nozzle 36 to another as a function of requirements. In an embodiment, the diameter d of the nozzles is of the same order of magnitude as the thickness of the shift in the boundary layer at the trailing edge 32 of the pylon when the aircraft is taking off (Mach number about 0.2), i.e. about 1.25 millimeters (mm) to 2.5 mm.

Finally, the nozzles 36 may be spaced apart along the trailing edge 32 by a varying distance b, in an embodiment at most having the same order of magnitude as the thickness of the boundary layer at the trailing edge of the pylon 32 when the aircraft is taking off. For greater ease of integration and to reduce the complexity of the system, it may nevertheless be appropriate to increase the distance b between the nozzles 36, in particular as a function of the span of the pylon.

Figure 3:
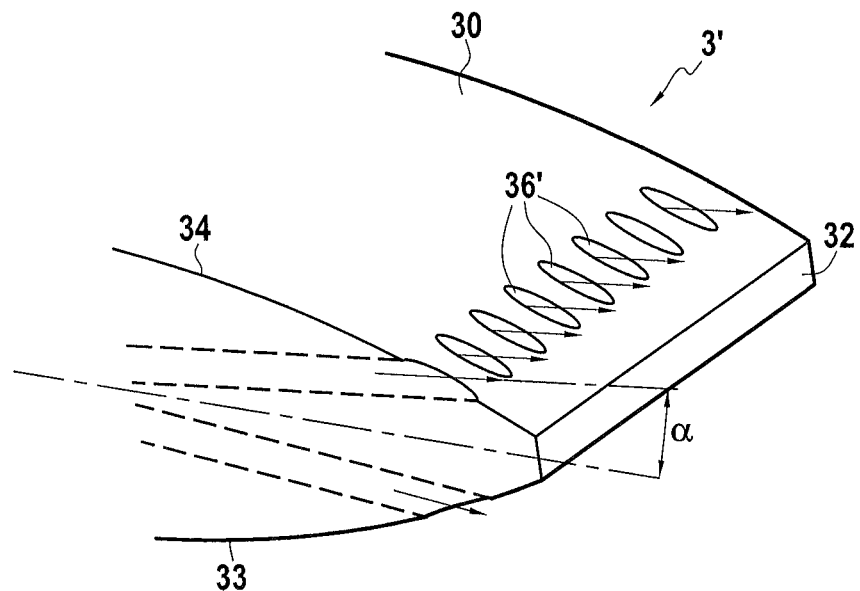

FIG. 3 is an enlarged view of a pylon 3' at its trailing edge 32, in another embodiment of the invention. It can be seen in this figure that the nozzles 36' open out on either side of the trailing edge 32 in the side faces 33 and 34 of the pylon 3', being flush with these faces (in other words, in this example, the length of the nozzles 36' is zero).

In addition, the nozzles 36' are configured in such a manner that they make an angle α with a plane of the pylon passing substantially through the trailing edge 32 and the leading edge 31. In this configuration, the blow nozzles 36' serve to compensate residual lift effects of the attachment pylon that might lead to asymmetry of the wake.

Figure 4:
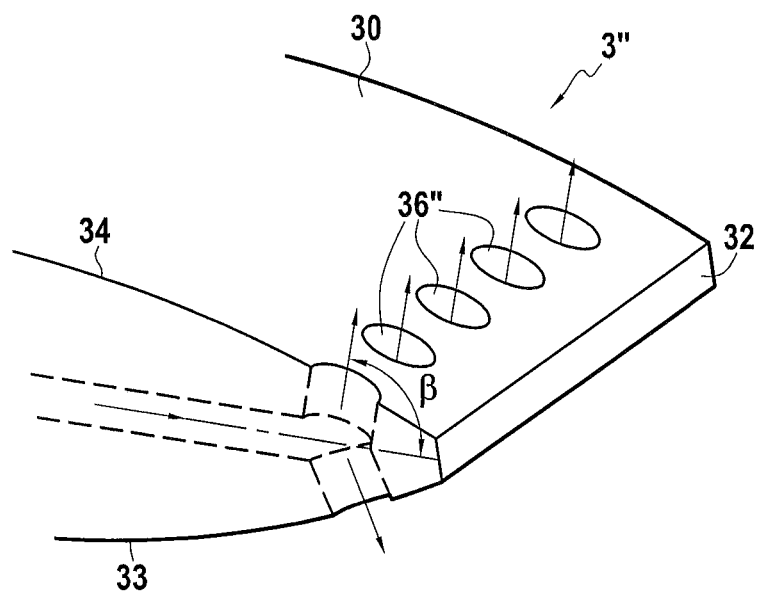

FIG. 4 shows a variant of the FIG. 3 embodiment in which the angle β defined between the nozzles 36" and the plane of the pylon passing through the trailing edge 32 and the leading edge 31 is greater than the above-specified angle α.

In the examples of FIGS. 3 and 4, the outlet diameter of the nozzles 36', 36", their length, and the distance between them may vary from one nozzle to another or may be of fixed value (e.g. having the same order as the thickness of the boundary layer at the trailing edge 32 while taking off, or the same order of magnitude as thickness of the shift of the boundary layer for the diameter of the nozzles), as described above for the example of FIG. 2.

In the examples shown and described above, the nozzles 36, 36', 36" generally present respective outlet edges of the nozzles that are circular or elliptical in shape. In other words, the nozzles 36, 36', 36" present outlet sections that are circular or elliptical. It should be observed that by varying these edges (or in other words these nozzle outlet sections), it is possible to present shapes that are different, presenting portions in relief, e.g. so as to present sawteeth or undulations, that are distributed periodically or in random manner around the circumference of the outlet edges of the nozzles. When present, the noise specific to the nozzles associated with the blowing can be attenuated by modifying the shapes of the outlet edges of the nozzles 36, 36', 36", in this way.

Finally, in a beneficial provision, the air may be blown in pulsed manner at a predetermined frequency, in particular in order to control the flow rate of the air blown through the nozzles. Nevertheless, care should be taken to ensure that the frequency at which the air is pulsed is less than the passing frequency of a blade of the propeller facing the pylon in order to avoid creating periodic turbulent structures in the wake. If the pulsed frequency is too high, a sound source of tonal monopole type (due to a periodic signal) might appear in the audible frequency range (20 Hz to 20 kHz). This phenomenon would create additional noise associated with blowing, which is not desirable.

In a variant, the air may be pulsed in random manner, while still making sure that the frequency of the pulsing is less than the passing frequency of a blade of the propeller facing the pylon. Specifically, if the random frequency is too high, then a time correlation phenomenon can appear between the noise sources, and that would increase the overall noise, which is likewise not desirable.

By way of example, the optionally random frequency at which the blown air is pulsed may be selected to be less than equal to 20 Hz, in order to avoid the above-mentioned drawbacks.

The invention claimed is:

1. A propulsion assembly for an aircraft, the assembly comprising:
   a turbojet having at least one unducted propulsive propeller; and
   an attachment pylon for attaching the turbojet to a structural element of the aircraft, said attachment pylon being positioned on the turbojet upstream from the unducted propulsive propeller and having a streamlined profile defined by two opposite side faces extending transversely between a leading edge and a trailing edge;
   wherein the attachment pylon has a plurality of blow nozzles situated in the vicinity of its trailing edge and configured to blow air taken from a pressurized portion of the turbojet, said blow nozzles being positioned over at least a fraction of the trailing edge of the attachment pylon that extends longitudinally facing at least a portion of the unducted propulsive propeller,
   wherein each of the plurality of blow nozzles has a circular or elliptical outlet section,
   wherein the plurality of blow nozzles project out from the trailing edge of the attachment pylon,
   wherein the blow nozzles open out in line with the trailing edge of the attachment pylon, and
   wherein the blow nozzles are retractable into the inside of the attachment pylon.

2. A propulsion assembly according to claim 1, further comprising at least one valve configured to control an arrival of air at least one blow nozzle.

3. A method of reducing noise generated by an attachment pylon for attaching a turbojet to a structural element of an aircraft, the turbojet having at least one unducted propulsive propeller, the attachment pylon being positioned on the turbojet upstream from the unducted propulsive propeller and having a streamlined profile extending transversely between a leading edge and a trailing edge, the method comprising blowing air taken from a pressurized portion of the turbojet from the trailing edge of the attachment pylon via a plurality of blow nozzles positioned over at least a fraction of the trailing edge of the attachment pylon extending longitudinally facing at least a portion of the unducted propulsive propeller, wherein each of the plurality of blow nozzles has a circular or elliptical outlet section, wherein the plurality of blow nozzles project out from the trailing edge of the attachment pylon wherein the blow nozzles open out in line with the trailing edge of the attachment pylon, and wherein the blow nozzles are retractable into the inside of the attachment pylon.

4. A method according to claim 3, further comprising controlling the air blown by the blow nozzles as a function of a stage of flight of the aircraft.

5. A method according to claim 3, wherein the air blown by the blow nozzles is pulsed at a predefined frequency that is less than a passing frequency of a blade of the unducted propulsive propeller facing the attachment pylon.

6. A method according to claim 3, wherein the air blown by the blow nozzles is pulsed sequentially at different random frequencies that are less than a passing frequency of blades of a propeller facing the attachment pylon.

* * * * *